United States Patent
Cai et al.

(10) Patent No.: US 12,222,889 B2
(45) Date of Patent: Feb. 11, 2025

(54) DATA TRANSMISSION METHOD, MODULE AND APPARATUS, DEVICE, AND STORAGE MEDIUM

(71) Applicant: SUNLUNE (SINGAPORE) PTE. LTD., Beijing (CN)

(72) Inventors: Kai Cai, Beijing (CN); Peijia Tian, Beijing (CN); Yusheng Zhang, Beijing (CN); Fuquan Wang, Beijing (CN); Ming Liu, Beijing (CN)

(73) Assignee: SUNLUNE (SINGAPORE) PTE. LTD., Beijing (CN)

( * ) Notice: Subject to any disclaimer, the term of this patent is extended or adjusted under 35 U.S.C. 154(b) by 8 days.

(21) Appl. No.: 18/358,015

(22) Filed: Jul. 24, 2023

(65) Prior Publication Data

US 2023/0367735 A1      Nov. 16, 2023

Related U.S. Application Data

(63) Continuation of application No. PCT/CN2022/142438, filed on Dec. 27, 2022.

(30) Foreign Application Priority Data

Dec. 30, 2021   (CN) .......................... 202111636129.8

(51) Int. Cl.
*G06F 13/42*      (2006.01)

(52) U.S. Cl.
CPC ...... *G06F 13/4204* (2013.01); *G06F 13/4282* (2013.01); *G06F 2213/0002* (2013.01); *G06F 2213/0004* (2013.01)

(58) Field of Classification Search
None
See application file for complete search history.

(56) References Cited

U.S. PATENT DOCUMENTS

| | | | |
|---|---|---|---|
| 7,366,821 B2* | 4/2008 | Fukaishi | G11C 7/1066 711/104 |
| 9,230,654 B2 | 1/2016 | Kim et al. | |
| 2004/0186949 A1 | 9/2004 | Liu et al. | |

FOREIGN PATENT DOCUMENTS

| | | |
|---|---|---|
| CN | 102012879 A | 4/2011 |
| CN | 107222218 A | 9/2017 |

(Continued)

OTHER PUBLICATIONS

International Search Report dated Mar. 20, 2023 in International Application No. PCT/CN2022/142438. English translation attached.

(Continued)

*Primary Examiner* — Farley Abad
*Assistant Examiner* — Dayton Lewis-Taylor

(57) ABSTRACT

A data transmission method includes: obtaining a target data packet to be stored, the target data packet including an address of the target data packet; determining, from predetermined N parallel-to-serial units based on the address of the target data packet, a target parallel-to-serial unit corresponding to the target data packet, the N parallel-to-serial units being connected to N storage control units in one-to-one correspondence; and transmitting, by the target parallel-to-serial unit, the target data packet to a target storage control unit, and storing, by the target storage control unit, the target data packet in a corresponding storage unit. The target storage control unit is a storage control unit, connected to the target parallel-to-serial unit, of the N storage control units. The target parallel-to-serial unit is configured to divide the target data packet into a plurality of data sub-packets.

16 Claims, 4 Drawing Sheets

(56) References Cited

FOREIGN PATENT DOCUMENTS

| | | |
|---|---|---|
| CN | 110377262 A | 10/2019 |
| CN | 114003525 A | 2/2022 |

OTHER PUBLICATIONS

First Office Action from corresponding Chinese Application No. 202111636129.8, dated Feb. 11, 2022. English translation attached.
The Grant Notice from corresponding Chinese Application No. 202111636129.8, dated Mar. 16, 2022. English translation attached.

* cited by examiner

DATA TRANSMISSION METHOD, MODULE AND APPARATUS, DEVICE, AND STORAGE MEDIUM

CROSS-REFERENCE TO RELATED APPLICATIONS

The present application is a continuation of International Application No. PCT/CN2022/142438, filed on Dec. 27, 2022, which claims priority to Chinese patent application No. 202111636129.8, filed on Dec. 30, 2021, entitled "DATA TRANSMISSION METHOD, MODULE, APPARATUS, DEVICE, AND STORAGE MEDIUM". The disclosures of the aforementioned applications are hereby incorporated by reference in their entireties.

FIELD

The present disclosure relates to the field of communication technologies, and more particularly, to a data transmission method, module and apparatus, a device, and a storage medium.

BACKGROUND

Currently, a Dynamic Random Access Memory (DRAM) with a high storage density is usually used for storing large volumes of data. With the same transmission protocol, efficiency of transmitting a data packet increases as a transmission bit width of the data packet increases.

However, a transmission bit width of a memory, as being limited by a hardware structure, is usually smaller than a transmission bit width of a data packet. Therefore, efficiency of transmitting the data packet is restricted by the transmission bit width of the memory, resulting in low efficiency of transmitting the data packet.

SUMMARY

The present disclosure provides a data transmission method, module and apparatus, a device, and a storage medium.

In a first aspect, the present disclosure provides a data transmission method. The data transmission method includes: obtaining a target data packet to be stored, the target data packet comprising an address of the target data packet; determining, from predetermined N parallel-to-serial units based on the address of the target data packet, a target parallel-to-serial unit corresponding to the target data packet, wherein the N parallel-to-serial units are connected to N storage control units in one-to-one correspondence, N being an integer greater than 1; and transmitting, by the target parallel-to-serial unit, the target data packet to a target storage control unit, and storing, by the target storage control unit, the target data packet in a corresponding storage unit. The target storage control unit is a storage control unit, connected to the target parallel-to-serial unit, of the N storage control units. The target parallel-to-serial unit is configured to divide the target data packet into a plurality of data sub-packets.

In a second aspect, the present disclosure provides a data transmission module. The data transmission module is configured to perform the above method. The data transmission module includes a transmitting unit, a write data path interface, N parallel-to-serial units, and N storage control units. The write data path interface has an input end connected to an output end of the transmitting unit and an output end connected to an input end of each of the N parallel-to-serial units. Output ends of the N parallel-to-serial units are connected to input ends of the N storage control units in a one-to-one correspondence, N being an integer greater than 1. The transmitting unit is configured to obtain a target data packet, and transmit the target data packet to the write data path interface, the target data packet comprising an address of the target data packet. The write data path interface is configured to determine, from the N parallel-to-serial units based on the address of the target data packet, a target parallel-to-serial unit corresponding to the target data packet, and transmit the target data packet to the target parallel-to-serial unit. The target parallel-to-serial unit is configured to transmit the target data packet to a target storage control unit, and divide the target data packet into a plurality of data sub-packets, the target storage control unit being a storage control unit, connected to the target parallel-to-serial unit, of the N storage control units. The target storage control unit is configured to store the target data packet in a corresponding storage unit.

In a third aspect, the present disclosure provides a data transmission apparatus. The data transmission apparatus includes an obtaining unit, a determining unit, and a transmitting unit. The obtaining unit is configured to obtain a target data packet to be stored, the target data packet comprising an address of the target data packet. The determining unit is configured to determine, from predetermined N parallel-to-serial units based on the address of the target data packet, a target parallel-to-serial unit corresponding to the target data packet, where the N parallel-to-serial units are connected to N storage control units in one-to-one correspondence, N being an integer greater than 1. The transmitting unit configured to transmit, by the target parallel-to-serial unit, the target data packet to a target storage control unit, and store, by the target storage control unit, the target data packet in a corresponding storage unit, wherein the target storage control unit is a storage control unit, connected to the target parallel-to-serial unit, of the N storage control units.

In a fourth aspect, embodiments of the present disclosure provide a chip. The chip includes a processor and a memory. The memory is configured to store a computer program. The processor is configured to perform the method according to the first aspect or any implementation of the first aspect by calling and executing the computer program stored in the memory.

In a fifth aspect, embodiments of the present disclosure provide an electronic device. The electronic device includes a processor and a memory. The memory is configured to store a computer program. The processor is configured to perform the method according to the method in the first aspect or any implementation of the first aspect by calling and executing the computer program stored in the memory.

In a sixth aspect, embodiments of the present disclosure provide a computer-readable storage medium. The computer-readable storage medium is configured to store a computer program. The computer program causes a computer to perform the method according to the first aspect or any implementation of the first aspect.

In a seventh aspect, a computer program is provided. The computer program, when running on a computer, causes the computer to perform the method according to the first aspect or any implementation of the first aspect.

BRIEF DESCRIPTION OF THE DRAWINGS

In order to clearly explain technical solutions of embodiments of the present disclosure, drawings used in description of embodiments are briefly described below. Obviously, the drawings as described below are merely some embodiments of the present disclosure. Based on these drawings, other drawings can be obtained by those skilled in the art without creative effort.

DETAILED DESCRIPTION

Technical solutions according to embodiments of the present disclosure will be described and explained below in combination with accompanying drawings of the embodiments of the present disclosure. Obviously, the embodiments described below are only a part of the embodiments of the present disclosure, rather than all embodiments of the present disclosure. Based on the embodiments of the present disclosure, all other embodiments obtained by those skilled in the art without creative labor shall fall within the protection scope of the present disclosure.

It should be noted that terms "first" and "second" in the specification and claims of the present disclosure are used to distinguish similar objects, rather than to describe a specific sequence or a chronological order. It should be understood that data defined by these terms may be interchanged with each other where appropriate, and thus the embodiments of the present disclosure described herein can be implemented in a sequence other than those illustrated or described herein. In addition, terms "including", "include", "comprising", "comprise", "having", and any variations thereof are intended to cover non-exclusive inclusions. For example, a process, method, system, product, or server that includes a series of steps or units is not necessarily limited to those clearly listed steps or units, but may also include other steps or units that are not clearly listed or are inherent to the process, method, product, or device.

Embodiments of the present disclosure relate to the field of data transmission technologies.

Before introducing technical solutions of the present disclosure, the knowledge related to the present disclosure is described below.

With the development of blockchain, a volume of Directed Acyclic Graph (DAG) data gradually increases to be more than 4 GB. In addition, the DAG data is updated with time, and an update cycle is about 5.2 days. Therefore, it has higher requirements on the transmission efficiency of the DAG data.

Due to a large volume of the DAG data, a DRAM is usually used to store the DAG data. The DAG data is required to be transmitted to the DRAM before a calculation of a proof-of-work chip. Since the DRAM requires to be periodically charged by constantly refreshing to avoid a loss of data in the DRAM, the DRAM is unable to receive data during the refreshing operation. That is, the DRAM cannot receive data at any moment. Therefore, a DAG data packet for transmitting the DAG data at least contains a data control flow signal, an address of the DAG data packet, and data to be stored. The data control flow signal is used to indicate a time point at which the DAG data packet is transmitted. The address of the DAG data packet is used to determine a corresponding storage unit of the DAG data packet in the memory.

Figure 1:
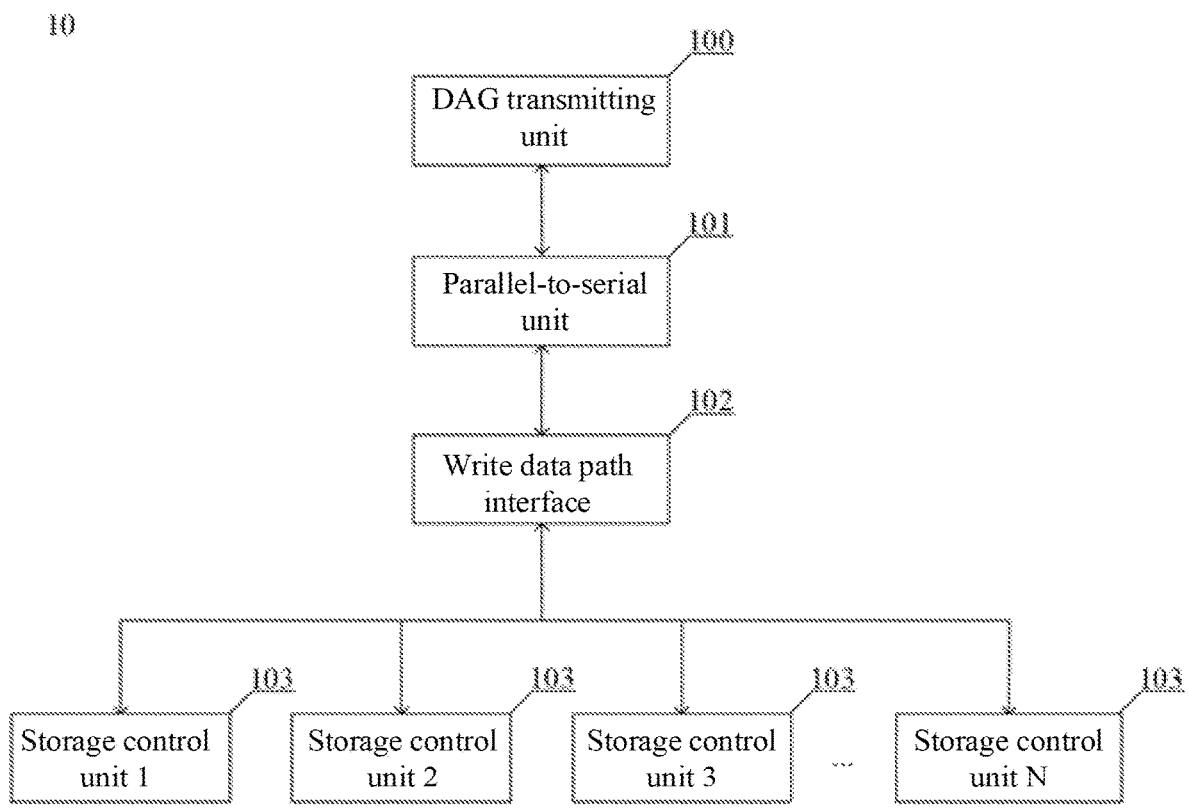
FIG. 1 is a schematic structural diagram of a data transmission module known in the related art.

FIG. 1 illustrates a data transmission module known in the related art. As illustrated in FIG. 1, the data transmission module 10 in the related art includes a transmitting unit 100, a parallel-to-serial unit 101, a write data path interface 102, and N storage control units 103.

An algorithm for calculating the DAG data determines a bit width of a generated DAG data packet, and a physical structure of the DRAM determines an input bit width of the DRAM. Since the input bit width of DRAM is smaller than the bit width of the DAG data packet, the data transmission module 10 needs to divided, through the parallel-to-serial unit 101, the DAG data packet into a plurality of data sub-packets each having a bit width smaller than the input bit width of the DRAM, and then transmits the plurality of data sub-packets to the write data path interface 101 sequentially. The write data path interface 101 selects, based on an address of the DAG data packet, a target storage control unit from the N storage control units 103, and transmits the plurality of data sub-packets to the target storage control unit. The target storage control unit stores the DAG data packet in a corresponding storage unit to complete transmission of the DAG data packet. The transmitting unit 100 is capable of transmitting one DAG data packet in one clock cycle. However, since the parallel-to-serial unit 101 can transmit only one data sub-packet in one clock cycle, the transmission of the plurality of data sub-packets needs a plurality of clock cycles. The parallel-to-serial unit 101 can only receive a next DAG data packet when the transmission of data sub-packets corresponding to an immediately previous DAG data packet is completed. In this way, data congestion of the DAG data packets may occur at an output end of the transmitting unit 100, resulting in low efficiency of transmitting the data.

For example, the bit width of the DAG data packet is 512 bits, while the input bit width of the DRAM is 128 bits, and the DAG data packet is divided by the parallel-to-serial unit 101 into 4 data sub-packets. In this case, the parallel-to-serial unit 101 transmits one DAG data packet over 4 cycles, and at the output end of the transmitting unit 100, transmission efficiency of the DAG packet of 512 bit is monitored to be no more than 25 percent.

The bit width of the DAG data packet refers to an amount of data that can be transmitted by the DAG data packet each time. The input bit width of the DRAM refers to an amount of data that can be received by the DRAM each time.

To solve the above problems, in the embodiments of the present disclosure, N parallel-to-serial units are provided and connected to N storage units in one-to-one correspondence. In actual use, a target parallel-to-serial unit corresponding to a target data packet to be stored can be determined from the N parallel-to-serial units based on an address of the target data packet. The target data packet can be transmitted to a target storage control unit through the target parallel-to-serial unit to avoid data packet congestion, which in turn improves efficiency of data packet transmission.

The technical solutions of the embodiments of the present disclosure will be described in detail below with some embodiments. The following embodiments can be combined with each other. The same or similar concepts or processes may not be repeated in some embodiments.

Figure 2:
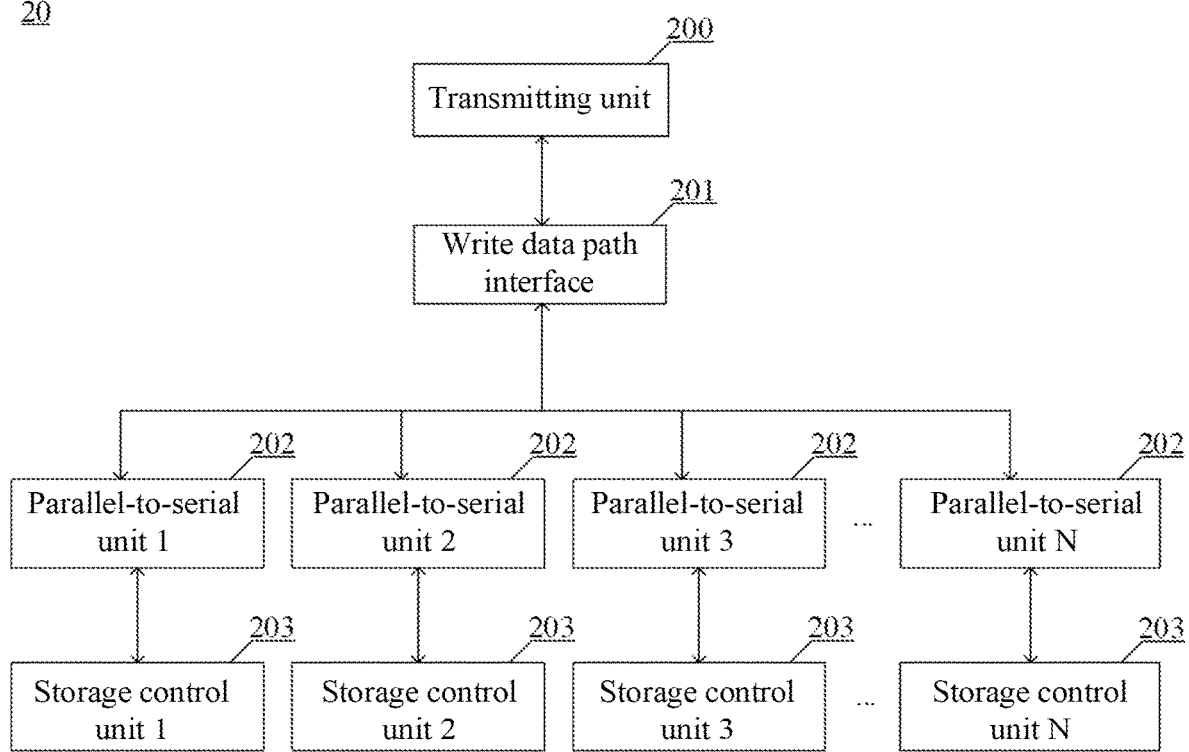
FIG. 2 is a schematic structural diagram of a data transmission module according to an embodiment of the present disclosure.

FIG. 2 is a schematic structural diagram of a data transmission module 20 according to an embodiment of the present disclosure. As illustrated in FIG. 2, the module 20 includes a transmitting unit 200, a write data path interface 201, N parallel-to-serial units 202, and N storage control units 203.

The write data path interface 201 has an input end connected to an output end of the transmitting unit 200 and an output end connected to an input end of each of the N parallel-to-serial units 202. The output ends of the N parallel-to-serial units 202 are connected to the input ends of the N storage control units 203 in a one-to-one correspondence. N is an integer greater than 1.

The transmitting unit 200 is configured to obtain a target data packet, and transmit the target data packet to the write data path interface 201. The target data packet includes an address of the target data packet.

The address of the target data packet refers to an address of a target storage unit corresponding to the target data packet. For example, each storage control unit manages D storage units. In this case, the address of the target storage unit ranges from 0 to (D−1)×N, with D being an integer greater than 1. D is also referred to as an address depth of the storage control unit. The target data packet may be calculated by a Central Processing Unit (CPU), a Micro Control Unit (MCU), or a System on Chip (SoC), or may be obtained from another storage device.

The write data path interface 201 is configured to determine, from the N parallel-to-serial units 202 based on the address of the target data packet, a target parallel-to-serial unit corresponding to the target data packet, and transmit the target data packet to the target parallel-to-serial unit.

In some embodiments, the write data path interface 201 determines, from the N parallel-to-serial units 202 based on the address of the target data packet, the target parallel-to-serial unit corresponding to the target data packet by: determining, based on the address of the target data packet and the number of the storage control units 203, a target storage control unit 203 corresponding to the target data packet; and determining the parallel-to-serial unit 202 connected to the target storage control unit as the target parallel-to-serial unit corresponding to the target data packet.

In some other embodiments, the write data path interface 201 is configured to determine, from the N parallel-to-serial units 202 based on the address of the target data packet, the target parallel-to-serial unit corresponding to the target data packet by: determining, based on the address of the target data packet and an address depth of a storage unit, the target storage control unit 203 corresponding to the target data packet; and determining the parallel-to-serial unit 202 connected to the target storage control unit as the target parallel-to-serial unit corresponding to the target data packet. Rounding may be round-up or round-down.

In some embodiments, the write data path interface 201 is configured to: determine a remainder between the address of the target data packet and the number of the storage control units 203; and determine, from the N storage control units 203, the storage control unit 203 identified as the remainder to be the target storage control unit corresponding to the target data packet.

For example, it is assumed that the address of the target data packet is $A_{dd}$, the N storage control units are sequentially identified as 1, 2, . . . , N, and a quotient of $A_{dd}$ divided by N is K, with a remainder of L, where N, $A_{dd}$, K, and L are all integers. In this case, it can be determined that the storage control unit identified as L among the N storage control units is the target storage control unit corresponding to the target data packet.

In other embodiments, the write data path interface 201 may further be configured to determine a rounded result of dividing the address of the target data packet by the number of storage control units 203, and determine, from the N storage control units 203, the storage control unit identified as the rounded result to be the target storage control unit corresponding to the target data packet.

For example, it is assumed that the address of the target data packet is $A_{dd}$, the N storage control units are sequentially identified as 1, 2, . . . , N, and a rounded result of dividing $A_{dd}$ by N is K, where N, $A_{dd}$, and K are all integers. In this case, it can be determined that the storage control unit identified as K among the N storage control units is the target storage control unit corresponding to the target data packet.

The target parallel-to-serial unit is configured to divide the target data packet into a plurality of data sub-packets, transmit the plurality of data sub-packets to the target storage control unit, and store, by means of the target storage control unit, the target data packet in the corresponding storage unit. The target storage control unit is the storage control unit 203 connected to the target parallel-to-serial unit.

In some embodiments, the write data path interface 201 is specifically configured to determine, as a storage address of the target data packet in the corresponding storage unit, a quotient between the address of the target data packet and the number of the storage control units 203.

The write data path interface 201 is configured to store, by means of the target storage control unit, the target data packet in the corresponding storage unit based on the storage address.

For example, the address of the target data packet is $A_{dd}$, and a quotient of $A_{dd}$ divided by N is K, with a remainder of L, where N, $A_{dd}$, K, and L are all integers. In this case, it can be determined that the storage address of the target data packet in the storage unit is the storage control unit having an address of K in the storage control unit identified as L among the N storage control units.

In other embodiments, the write data path interface 201 is configured to establish another correspondence between the address of the target data packet and the number of the storage control units 203, which is not specifically limited in the embodiments of the present disclosure.

In some embodiments, the target data packet is a DAG data packet. An algorithm for calculating the DAG data packet determines that a bit width for generating the DAG data packet is 512 bits or 1,024 bits, which is unequal to a common input bit width of 64 bits or 128 bits for the storage unit. In addition, when the target data packet is the DAG data packet, the above method is more suitable to be applied to the DAG data packet due to its large volume. On this basis, when the above data transmission module is disposed in the proof-of-work chip, it takes less time for the proof-of-work chip to transmit the DAG data packet, and thus a computing power loss is small.

In some embodiments, the address of the target data packet is randomly generated during generation of the target data packet. That is, the address of the target data packet may be issued in real time during calculation of the target data packet. The address of the target data packet may also be assigned after the data transmitting unit 200 obtains a complete target data packet.

For example, for the plurality of target data packets that have been obtained, the target data packet having an address of 0 may hit a storage control unit identified as 1, the target data packet having an address of 1 may hit the storage control unit identified as 1, and so on. By analogy, the target data packet having an address of (N−1) may hit a storage control unit identified as N. In this way, addresses of the plurality of target data packets will not hit the same storage control unit consecutively, and thus the plurality of target data packets will not hit the same parallel-to-serial unit consecutively. Therefore, the plurality of parallel-to-serial units may issue data sub-packets simultaneously to avoid congestion of the target data packets.

In some embodiments, the parallel-to-serial unit 202 is further configured to: divide the target data packet into M data sub-packets; and transmit the M data sub-packets to the target storage control unit, sequentially, where M is a positive integer.

By dividing the target data packet into the M data sub-packets, the parallel-to-serial unit 202 allows the bit width of each data sub-packet smaller than or equal to the input bit width of the storage unit, and thus the M data sub-packets can be transmitted to the target storage control unit in M times sequentially. In this way, the input bit width of the storage control unit may be any input bit width without affecting the transmission efficiency of the data transmission module.

On this basis, during the transmission of the target data packet, due to the presence of the N parallel-to-serial units 202, the write data path interface 201 determines, from the predetermined N parallel-to-serial units, the parallel-to-serial unit corresponding to the target data packet as the target parallel-to-serial unit before transmission of the target data packet. The target data packet is transmitted to the corresponding target parallel-to-serial unit, and each parallel-to-serial unit corresponds to one storage control unit. In this way, when the plurality of target data packets does not hit the same storage control unit, different parallel-to-serial units among the N parallel-to-serial units may transmit the target data packets to the corresponding storage control units simultaneously, thereby significantly improving the transmission efficiency. For example, if the bit width of the target data packet is 512 bits and the input bit width of the storage control unit is 128 bits, the transmission efficiency of the data packet monitored at the output end of the transmitting unit can be 100%. Such a transmission speed is about 4 times faster than that of the data transmission module in the related art, thereby ensuring the efficiency of the data transmission module to the maximum extent.

In some embodiments, the above modules may be circuits distributed on the same chip. In this regard, the data transmission module according to the embodiments of the present disclosure may be regarded as a chip having a data transmission function. The above-mentioned modules may also be program codes. In this regard, the data transmission module provided by the present disclosure may be regarded as program codes executed by a computer.

The data transmission module according to the embodiments of the present disclosure is described above. On basis of this, the data transmission method provided by the present disclosure is described below.

Figure 3:
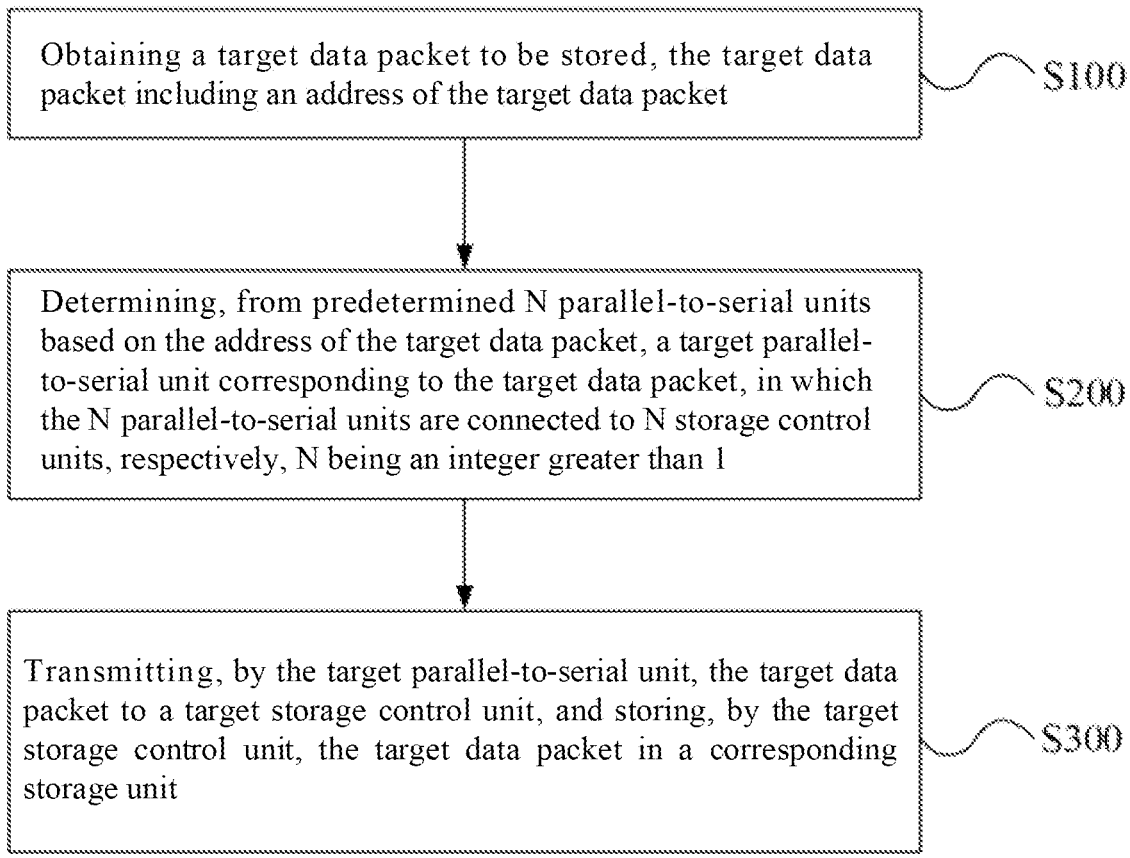
FIG. 3 is a flowchart of a data transmission method according to an embodiment of the present disclosure.

FIG. 3 is a flowchart of a data transmission method according to an embodiment of the present disclosure. As illustrated in FIG. 3, the method includes actions at blocks S100 to S300.

At S100, a target data packet to be stored is obtained. The target data packet includes an address of the target data packet.

The address of the target data packet may be generated during the generation of the target data packet or may be assigned after the target data packet is obtained.

At S200, a target parallel-to-serial unit corresponding to the target data packet is determined from predetermined N parallel-to-serial units based on the address of the target data packet. The N parallel-to-serial units are connected to N storage control units in one-to-one correspondence. N is an integer greater than 1.

In some embodiments, the action of determining the target parallel-to-serial unit corresponding to the target data packet at S200 from the predetermined N parallel-to-serial units based on the address of the target data packet includes actions at blocks S210 and S220.

At S210, the target storage control unit corresponding to the target data packet is determined based on the address of the target data packet and the number of the storage control units.

In some embodiments, the action of determining the target storage control unit corresponding to the target data packet based on the address of the target data packet and the number of the storage control units at S210 includes actions at blocks S211 and S212.

At S211, a remainder between the address of the target data packet and the number of the storage control units is determined.

At S212, the storage control unit identified as the remainder is determined from the N storage control units to be the target storage control unit corresponding to the target data packet.

It is assumed that the address of the target data packet is $A_{dd}$, the target storage control units are sequentially identified as 1, 2, ..., N, and $A_{dd} \div N = K ... L$, where n, $A_{dd}$, K and L are all integers. In this case, it can be determined that the storage control unit identified as L among the N storage control units is the storage control unit corresponding to the target data packet.

It should be understood that an implementation of the action at S210 is not limited to the above method. The action at S210 may be implemented with any method capable of establishing the correspondence between the addresses of the target data packets and the number of the storage control units to select different storage control units for different target data packets.

For example, it is assumed that the address of the target data packet is $A_{dd}$, the target storage control units are sequentially identified as 1, 2, ..., N, and $[A_{dd} \div N] = K$. In this case, it can be determined that the storage control unit identified as K among the N storage control units is the storage control unit corresponding to the target data packet, where [ ] represents a function for rounding.

At S220, the parallel-to-serial unit connected to the target storage control unit is determined as the target parallel-to-serial unit corresponding to the target data packet.

The address of the target data packet is a corresponding address of the target data packet stored by the storage control unit in the storage unit. The N parallel-to-serial units are connected to the N storage control units in one-to-one correspondence, i.e., the storage control units correspond to the parallel-to-serial units in one-to-one correspondence. Thus, by determining the target storage control unit corresponding to the target data packet, the parallel-to-serial unit connected to the target storage control unit can be determined as the target parallel-to-serial unit.

At S300, the target data packet is transmitted to a target storage control unit by the target parallel-to-serial unit, and the target data packet is stored in a corresponding storage unit by means of the target storage control unit. The target storage control unit is a storage control unit connected to the target parallel-to-serial unit.

N is a positive integer, and may be set by a user according to a hardware device and requirements. Therefore, the N parallel-to-serial units are referred to as the predetermined N parallel-to-serial units. Since the target storage units are connected to the target parallel-to-serial units in one-to-one correspondence, the storage unit corresponding to the target data packet is selected by selecting the storage control unit corresponding to the target storage unit.

In some embodiments, the action of storing, by the target storage control unit, the target data packet in the corresponding storage unit at S300 includes actions at blocks S310 and S320.

At S310, a quotient between the address of the target data packet and the number of the storage control units is determined as a storage address of the target data packet in the corresponding storage unit.

At S320, the target data packet is stored, by the target storage control unit, in the corresponding storage unit based on the storage address.

Each storage control unit controls and manages D storage units, and each storage unit corresponds to one address in the storage control unit. In the target storage control unit, in order to determine the storage unit corresponding to the target data packet, it is necessary to determine the storage address of the target data packet in the corresponding storage unit. For example, when each storage control unit controls and manages D storage units, it is assumed that the address of the target data packet is $A_{dd}$, the number of the target storage control units is N, and $A_{dd} \div N = K \ldots L$, where $A_{dd}$, K, and L are all integers, and K<L. In this case, K is determined as the storage address of the target data packet in the storage unit. Thus, the storage control unit identified as L stores the target data packet in the storage unit having an address of K.

In some embodiments, the address of the target data packet is randomly generated during generation of the target data packet. That is, the address of the target data packet may be issued in real time during calculation of the target data packet. The address of the target data packet may also be assigned after the data transmitting unit 200 obtains a complete target data packet.

For example, for the plurality of target data packets that have been obtained, the target data packet having an address of 0 may hit a storage control unit identified as 1, the target data packet having an address of 1 may hit the storage control unit identified as 1, and so on. By analogy, the target data packet having an address of (N−1) may hit a storage control unit identified as N. In this way, addresses of the plurality of target data packets will not hit the same storage control unit consecutively, and thus the plurality of target data packets will not hit the same parallel-to-serial unit consecutively. Therefore, the plurality of parallel-to-serial units may issue data sub-packets simultaneously to avoid congestion of the target data packets.

In some embodiments, the target data packet is a DAG data packet. An algorithm for calculating the DAG data packet determines that a bit width for generating the DAG data packet is 512 bits or 1,024 bits, which is unequal to a common input bit width of 64 bits or 128 bits for the storage unit. In addition, when the target data packet is the DAG data packet, the above method is more suitable to be applied to the DAG data packet due to its large volume. On this basis, when the above data transmission module is disposed in the proof-of-work chip, it takes less time for the proof-of-work chip to transmit the DAG data packet, and thus a computing power loss is small.

In some embodiments, the action of transmitting, by the target parallel-to-serial unit, the target data packet to the target storage control unit at S300 includes actions at blocks S301 and S302.

At S301, the target data packet is divided, by the target parallel-to-serial unit, into the M data sub-packets to make the bit width of each data sub-packet smaller than or equal to the input bit width of the storage unit, and the M data sub-packets are transmitted, by the target parallel-to-serial unit, to the target storage control unit in M times sequentially. In this way, the input bit width of the storage control unit may be any input bit width without affecting the transmission efficiency of the data transmission module. At S302, the M data sub-packets are transmitted, by the target parallel-to-serial unit, to the target storage control unit sequentially, where M is a positive integer.

On this basis, during the transmission of the target data packet, the parallel-to-serial unit corresponding to the target data packet, as the target parallel-to-serial unit, is determined from the predetermined N parallel-to-serial units before transmission of the target data packet, and the target data packet is transmitted to the corresponding target parallel-to-serial unit, and each parallel-to-serial unit corresponds to one storage control unit. In this way, different parallel-to-serial units among the N parallel-to-serial units may transmit the plurality of target data packets to the corresponding storage control units simultaneously, thereby significantly improving the transmission efficiency.

It should be understood that FIG. 3 merely illustrates an example of the present disclosure and should not be construed as a limitation of the present disclosure.

The preferred implementations of the present disclosure are described in detail above in conjunction with the accompanying drawings. However, the present disclosure is not limited to specific details in the above implementations. A variety of simple variants of the technical solutions of the present disclosure can be made within the scope of the technical concept of the present disclosure, which shall fall within the protection scope of the present disclosure. For example, specific technical features described in the above specific implementations can be combined in any suitable manner without contradiction. To avoid unnecessary repetitions, not every possible combination is described separately in the present disclosure. For example, various implementations of the present disclosure can be combined arbitrarily, as long as they do not contradict the concept of the present disclosure. These combinations should also be considered as the content disclosed by the present disclosure.

Figure 4:
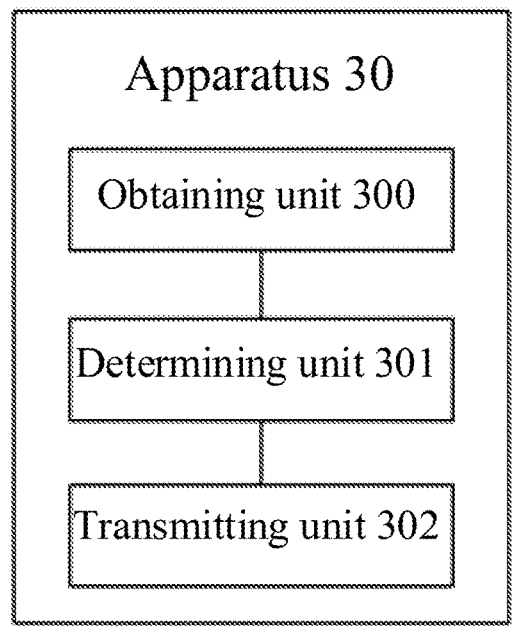
FIG. 4 is a schematic structural diagram of a data transmission apparatus according to an embodiment of the present disclosure.

FIG. 4 is a structural block diagram of a data transmission apparatus according to an embodiment of the present disclosure. As illustrated in FIG. 4, a data transmission apparatus according to an embodiment of the present disclosure includes an obtaining unit 300, a determining unit 301, and a transmitting unit 302.

The obtaining unit 300 is configured to obtain a target data packet to be stored. The target data packet includes an address of the target data packet.

The determining unit 301 is configured to determine, from predetermined N parallel-to-serial units based on the address of the target data packet, a target parallel-to-serial unit corresponding to the target data packet. The N parallel-to-serial units are connected to N storage control units in one-to-one correspondence.

The transmitting unit 302 is configured to transmit, by means of the target parallel-to-serial unit, the target data packet to a target storage control unit, and store, by means of the target storage control unit, the target data packet in a corresponding storage unit. The target storage control unit is a storage control unit connected to the target parallel-to-serial unit.

In some embodiments, the determining unit 301 is configured to: determine the target storage control unit corresponding to the target data packet based on the address of the target data packet and the number of the storage control units; and determine the parallel-to-serial unit connected to the target storage control unit as the target parallel-to-serial unit corresponding to the target data packet.

In some embodiments, the determining unit 301 is configured to: determine a remainder between the address of the target data packet and the number of the storage control units; and determine, from the N storage control units, the storage control unit identified as the remainder to be the target storage control unit corresponding to the target data packet.

In some embodiments, the transmitting unit 302 is configured to: determine, as a storage address of the target data packet in the corresponding storage unit, a quotient between the address of the target data packet and the number of the storage control units; and store, by means of the target storage control unit, the target data packet in the corresponding storage unit based on the storage address.

In some embodiments, the address of the target data packet is randomly generated during generation of the target data packet.

In some embodiments, the target data packet is a DAG data packet.

In some embodiments, the transmitting unit 302 is configured to: divide, by means of the target parallel-to-serial unit, the target data packet into M data sub-packets; and transmit, by means of the target parallel-to-serial unit, the M data sub-packets to the target storage control unit sequentially, where M is a positive integer.

It should be understood that the apparatus embodiments may correspond to the method embodiments, and reference may be made to the method embodiments for similar description of the apparatus embodiments. Details thereof will not be repeated here to avoid repetition. Specifically, the apparatus illustrated in FIG. 4 may perform the above method embodiments, and the above and other operations and/or functions of modules in the apparatus are respectively configured to perform the method embodiments corresponding to a computing device. Details thereof will be omitted here for simplicity.

Figure 5:
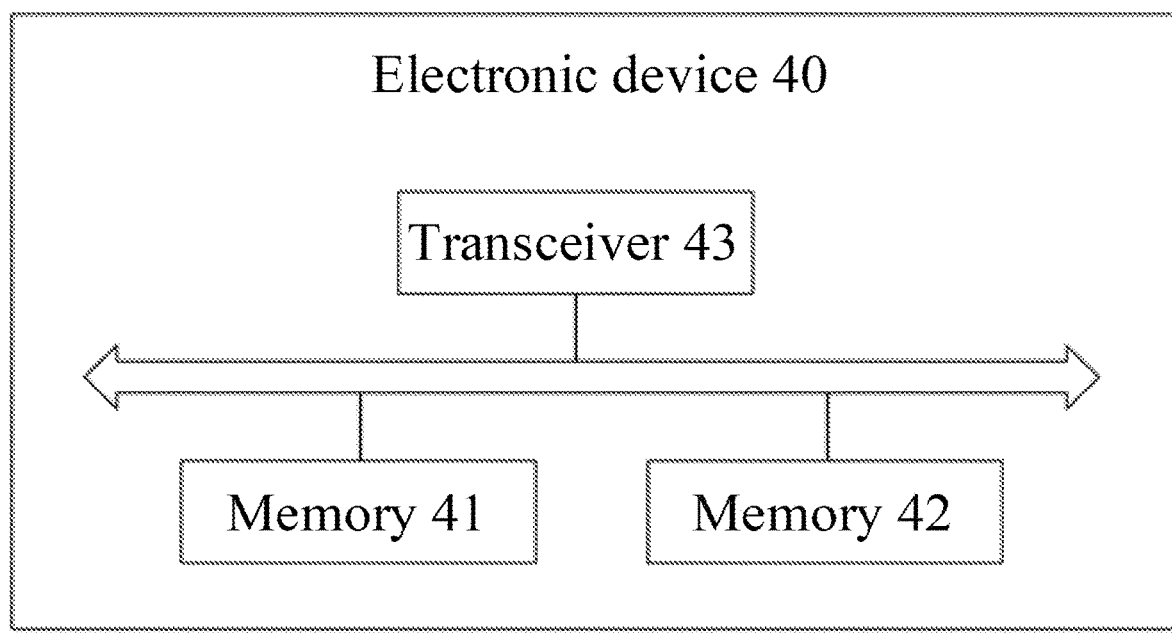
FIG. 5 is a schematic structural diagram of an electronic device according to an embodiment of the present disclosure.

FIG. 5 is a schematic block diagram of an electronic device according to an embodiment of the present disclosure. The electronic device may be a file encapsulation device or a file decapsulation device as described above, or the electronic device may have a function of the file encapsulation device or the file decapsulation device.

As illustrated in FIG. 5, an electronic device 40 may include a memory 41 and a memory 42.

The memory 41 is configured to store a computer program stored and transmit codes of the program to the memory 42. That is, the memory 42 can call the computer program from the memory 41 and execute the computer program to implement the method according to the embodiments of the present disclosure.

For example, the memory 42 may be configured to execute the above method embodiments according to instructions in the computer program.

In some embodiments of the present disclosure, the memory 42 may include, but not limited to, a general-purpose processor, a Digital Signal Processor (DSP), an Application Specific Integrated Circuit (ASIC), a Field Programmable Gate Array (FPGA) or other programmable logic devices, a discrete gate or a transistor logic device, a discrete hardware component, etc.

In some embodiments of the present disclosure, the memory 41 may include, but not limited to, a volatile memory and/or a non-volatile memory.

The non-volatile memory can be a Read-Only Memory (ROM), a Programmable ROM (PROM), an Erasable PROM (EPROM), an Electrically EPROM (EEPROM), or a flash memory. The volatile memory may be a Random Access Memory (RAM) configured as an external high-speed cache. By exemplary but not restrictive description, many forms of RAMs can be used, such as a Static RAM (SRAM), a Dynamic RAM (DRAM), a Synchronous DRAM (SDRAM), a Double Data Rate SDRAM (DDR SDRAM), an Enhanced SDRAM (ESDRAM), a synch link DRAM (SLDRAM), and a Direct Rambus RAM (DR RAM).

In some embodiments of the present disclosure, the computer program may be divided into one or more modules that are stored in the memory 41 and executed by the memory 42, so as to implement the method provided by the present disclosure. The one or more modules may be a series of instruction segments of the computer program that are capable of completing specific functions, and the instruction segments are used to describe an execution process of the computer program in the video production apparatus.

As illustrated in FIG. 4, the electronic device 40 may further include a transceiver 43, which may be connected to the memory 42 or the memory 41.

The memory 42 may control the transceiver 43 to communicate with other devices, specifically, to transmit information or data to other devices, or receive information or data transmitted by other devices. The transceiver 43 may include a transmitter and a receiver. The transceiver 43 may further include one or more antennas.

It should be understood that various components in the video production apparatus are connected via a bus system. In addition to a data bus, the bus system also includes a power bus, a control bus, and a status signal bus.

The present disclosure further provides a chip including a processor configured to perform the above embodiments.

The present disclosure further provides a computer storage medium having a computer program stored thereon. The computer program, when executed by a computer, causes the computer to perform the method according to the above method embodiments. In other words, the embodiments of the present disclosure further provide a computer program product including instructions. The instructions, when being executed by a computer, cause the computer to perform the method according to the above method embodiments.

When the present disclosure is implemented by software, it may be completely or partially embodied in the form of a computer program product. The computer program product includes one or more computer instructions. The computer program instructions, when being loaded and executed on a computer, produce all or a part of the processes or functions described in the embodiments of the present disclosure. The computer may be a general-purpose computer, an application specific computer, a computer network, or any other programmable device. The computer instructions may be stored in a computer-readable storage medium or transmitted from one computer-readable storage medium to another computer-readable storage medium. For example, the computer instructions may be transmitted from one website, computer, server, or data center to another website, computer, server, or data center via a wired manner (such as coaxial cable, optical fiber, Digital Subscriber Line (DSL)) or a wireless manner (such as infrared, wireless, microwave, etc.). The computer-readable storage medium may be any usable medium that can be accessed by a computer or a data storage device such as a server or a data center integrated with one or more usable medium. The usable medium may be a magnetic medium such as a floppy disk, a hard disk, a magnetic tape, an optical medium such as a Digital Video Disc (DVD), or a semiconductor medium such as a Solid-State Disk (SSD), etc.

It can be appreciated by those skilled in the art that, the exemplary modules and steps of the algorithm described in combination with the embodiments disclosed herein may be implemented in electronic hardware or a combination of computer software and electronic hardware, depending on specific applications and design constraint conditions of technical solutions. For each specific application, professionals and technicians can use different methods to implement the described functions, but such implementation should not be considered as going beyond the scope of the present disclosure.

In several embodiments provided by the present disclosure, it can be understood that, the systems, apparatuses and methods disclosed can be implemented in other ways. For example, the apparatus embodiments described above are merely illustrative. For example, the modules are merely divided based on logic functions. In practical implementation, the modules can be divided in other manners. For example, multiple modules or components can be combined or integrated into another system, or some features can be omitted or not executed. In addition, mutual coupling or direct coupling or communication connection described or discussed can be implemented as indirect coupling or communication connection via some interfaces, apparatuses or modules, and may be electrical, mechanical or in other forms.

The modules illustrated as separate components may be or not be separated physically, and components shown as modules may be or not be physical modules, i.e., may be located at one position, or distributed onto multiple network units. It is possible to select some or all of the modules according to actual needs, for achieving the objective of embodiments of the present disclosure. For example, respective functional modules in respective embodiments of the present disclosure can be integrated into one processing module, or can be present as separate physical entities. It is also possible to integrate two or more modules into one module.

The above description merely illustrates specific implementations of the present disclosure, and the scope of the present disclosure is not limited thereto. Any change or replacement within the technical scope disclosed by the present disclosure that can be easily conceived by those skilled in the art should fall in the protection scope of the present disclosure. The protection scope of the present disclosure is defined only by the claims.

What is claimed is:

1. A data transmission method, comprising:
    obtaining a target data packet to be stored, the target data packet comprising an address of the target data packet;
    determining, from predetermined N parallel-to-serial units based on the address of the target data packet, a target parallel-to-serial unit corresponding to the target data packet, wherein the N parallel-to-serial units are connected to N storage control units in one-to-one correspondence, N being an integer greater than 1; and
    transmitting, by the target parallel-to-serial unit, the target data packet to a target storage control unit, and storing, by the target storage control unit, the target data packet in a corresponding storage unit,
    wherein the target storage control unit is a storage control unit, connected to the target parallel-to-serial unit, of the N storage control units; and
    wherein the target parallel-to-serial unit is configured to divide the target data packet into a plurality of data sub-packets.

2. The method according to claim 1, wherein said determining, from the predetermined N parallel-to-serial units based on the address of the target data packet, the target parallel-to-serial unit corresponding to the target data packet comprises:
    determining, based on the address of the target data packet and the number of the storage control units, the target storage control unit corresponding to the target data packet; and
    determining, as the target parallel-to-serial unit corresponding to the target data packet, the parallel-to-serial unit connected to the target storage control unit.

3. The method according to claim 2, wherein said determining, based on the address of the target data packet and the number of the storage control units, the target storage control unit corresponding to the target data packet comprises:
    determining a remainder between the address of the target data packet and the number of the storage control units; and
    determining, from the N storage control units, the storage control unit identified as the remainder to be the target storage control unit corresponding to the target data packet.

4. The method according to claim 2, wherein said storing, by the target storage control unit, the target data packet in the corresponding storage unit comprises:
    determining, as a storage address of the target data packet in the corresponding storage unit, a quotient between the address of the target data packet and the number of the storage control units; and
    storing, by the target storage control unit based on the storage address, the target data packet in the corresponding storage unit.

5. The method according to claim 1, wherein the address of the target data packet is randomly generated during generation of the target data packet, and wherein the target data packet is a directed acyclic graph data packet.

6. The method according to claim 1, wherein said transmitting, by the target parallel-to-serial unit, the target data packet to the target storage control unit comprises:
    dividing, by the target parallel-to-serial unit, the target data packet into M data sub-packets; and
    transmitting, by the target parallel-to-serial unit, the M data sub-packets to the target storage control unit sequentially, M being a positive integer.

7. A chip, comprising:
    a processor; and
    a memory,
    wherein the memory is configured to store a computer program, and wherein the processor is configured to perform the method according to claim 1 by calling and executing the computer program stored in the memory.

8. A non-transitory computer-readable storage medium, configured to store a computer program, wherein the computer program causes a computer to perform the method according to claim 1.

9. A computer program, when being executed on a computer, causing the computer to perform the method according to claim 1.

10. A data transmission module, comprising: a transmitting unit, a write data path interface, N parallel-to-serial units, and N storage control units, wherein:
the write data path interface has an input end connected to an output end of the transmitting unit and an output end connected to an input end of each of the N parallel-to-serial units;
output ends of the N parallel-to-serial units are connected to input ends of the N storage control units in a one-to-one correspondence, N being an integer greater than 1;
the transmitting unit is configured to obtain a target data packet, and transmit the target data packet to the write data path interface, the target data packet comprising an address of the target data packet;
the write data path interface is configured to determine, from the N parallel-to-serial units based on the address of the target data packet, a target parallel-to-serial unit corresponding to the target data packet, and transmit the target data packet to the target parallel-to-serial unit;
the target parallel-to-serial unit is configured to transmit the target data packet to a target storage control unit, and divide the target data packet into a plurality of data sub-packets, the target storage control unit being a storage control unit, connected to the target parallel-to-serial unit, of the N storage control units; and
the target storage control unit is configured to store the target data packet in a corresponding storage unit.

11. The data transmission module according to claim 10, wherein the write data path interface is further configured to:
determine, based on the address of the target data packet and the number of the storage control units, the target storage control unit corresponding to the target data packet; and
determine, as the target parallel-to-serial unit corresponding to the target data packet, the parallel-to-serial unit connected to the target storage control unit.

12. The data transmission module according to claim 11, wherein the write data path interface is further configured to:
determine a remainder between the address of the target data packet and the number of the storage control units; and
determine, from the N storage control units, the storage control unit identified as the remainder to be the target storage control unit corresponding to the target data packet.

13. The data transmission module according to claim 11, wherein the write data path interface is further configured to:
determine, as a storage address of the target data packet in the corresponding storage unit, a quotient between the address of the target data packet and the number of the storage control units; and
store, by the target storage control unit based on the storage address, the target data packet in the corresponding storage unit.

14. The data transmission module according to claim 10, wherein the address of the target data packet is randomly generated during generation of the target data packet, and wherein the target data packet is a directed acyclic graph data packet.

15. The data transmission module according to claim 10, wherein the target parallel-to-serial unit is further configured to:
divide the target data packet into M data sub-packets; and
transmit the M data sub-packets to the target storage control unit sequentially, M being a positive integer.

16. An electronic device, comprising:
a processor; and
a memory,
wherein the memory is configured to store a computer program, and
wherein the processor is configured to perform a data transmission method by calling and executing the computer program stored in the memory, the data transmission method comprising:
obtaining a target data packet to be stored, the target data packet comprising an address of the target data packet;
determining, from predetermined N parallel-to-serial units based on the address of the target data packet, a target parallel-to-serial unit corresponding to the target data packet, wherein the N parallel-to-serial units are connected to N storage control units in one-to-one correspondence, N being an integer greater than 1; and
transmitting, by the target parallel-to-serial unit, the target data packet to a target storage control unit, and storing, by the target storage control unit, the target data packet in a corresponding storage unit,
wherein the target storage control unit is a storage control unit, connected to the target parallel-to-serial unit, of the N storage control units; and
wherein the target parallel-to-serial unit is configured to divide the target data packet into a plurality of data sub-packets.

* * * * *